June 4, 1946.                    J. MIHALYI                    2,401,706
                                RANGE FINDER
                          Filed March 13, 1943            2 Sheets-Sheet 1
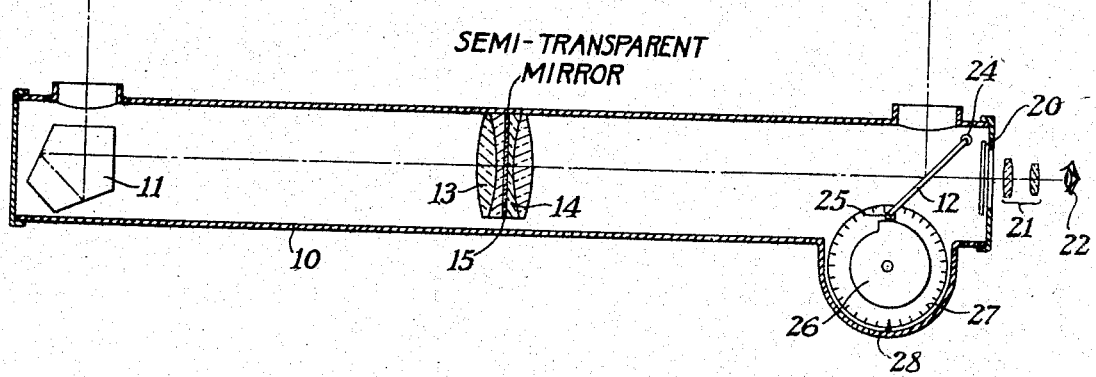
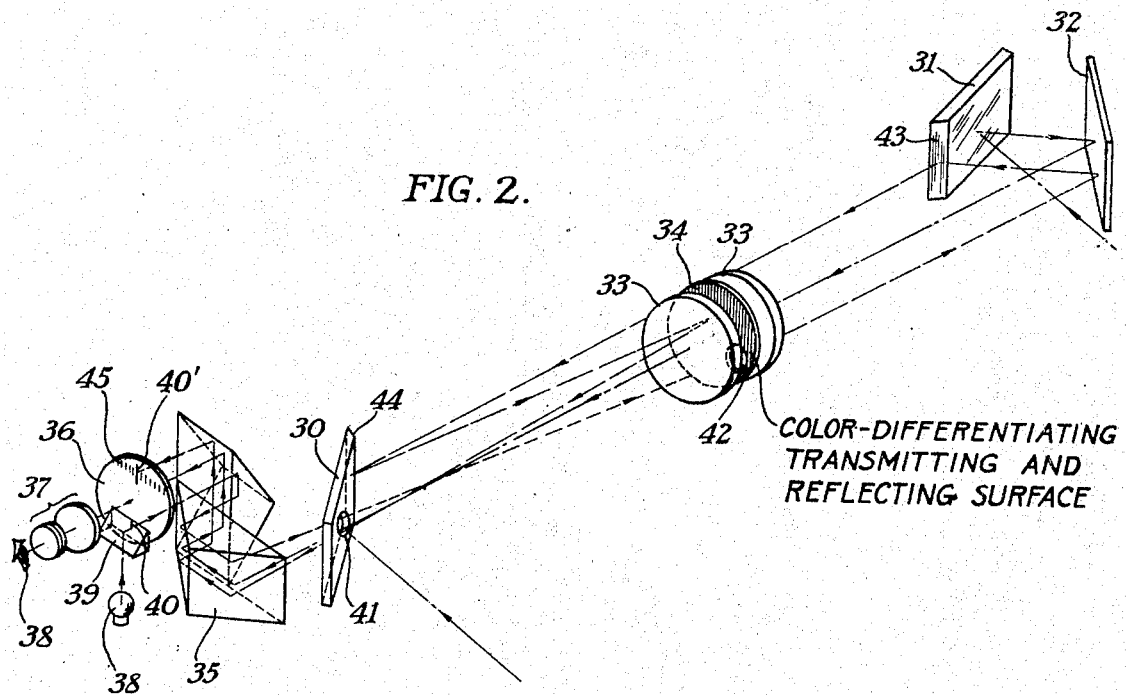
JOSEPH MIHALYI
INVENTOR

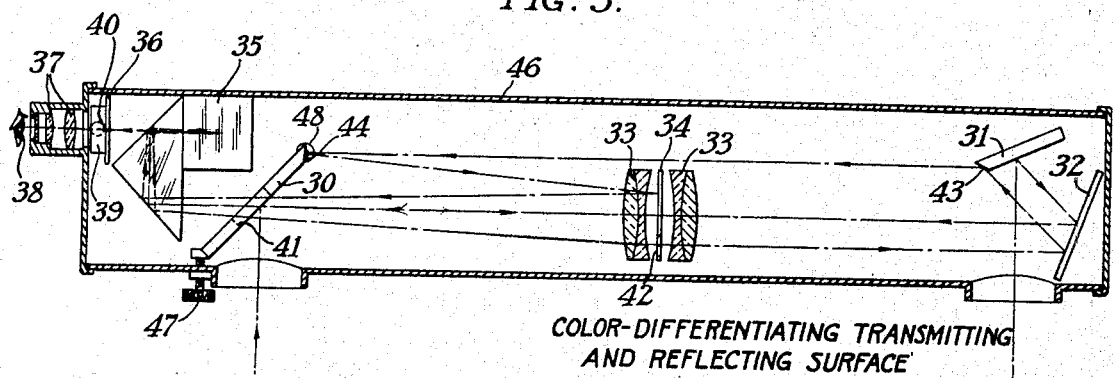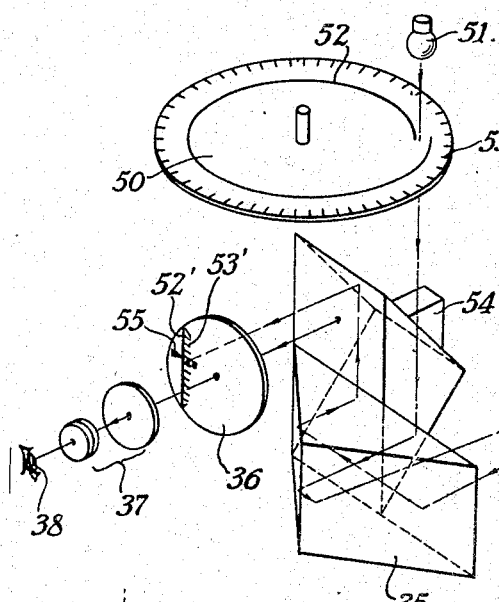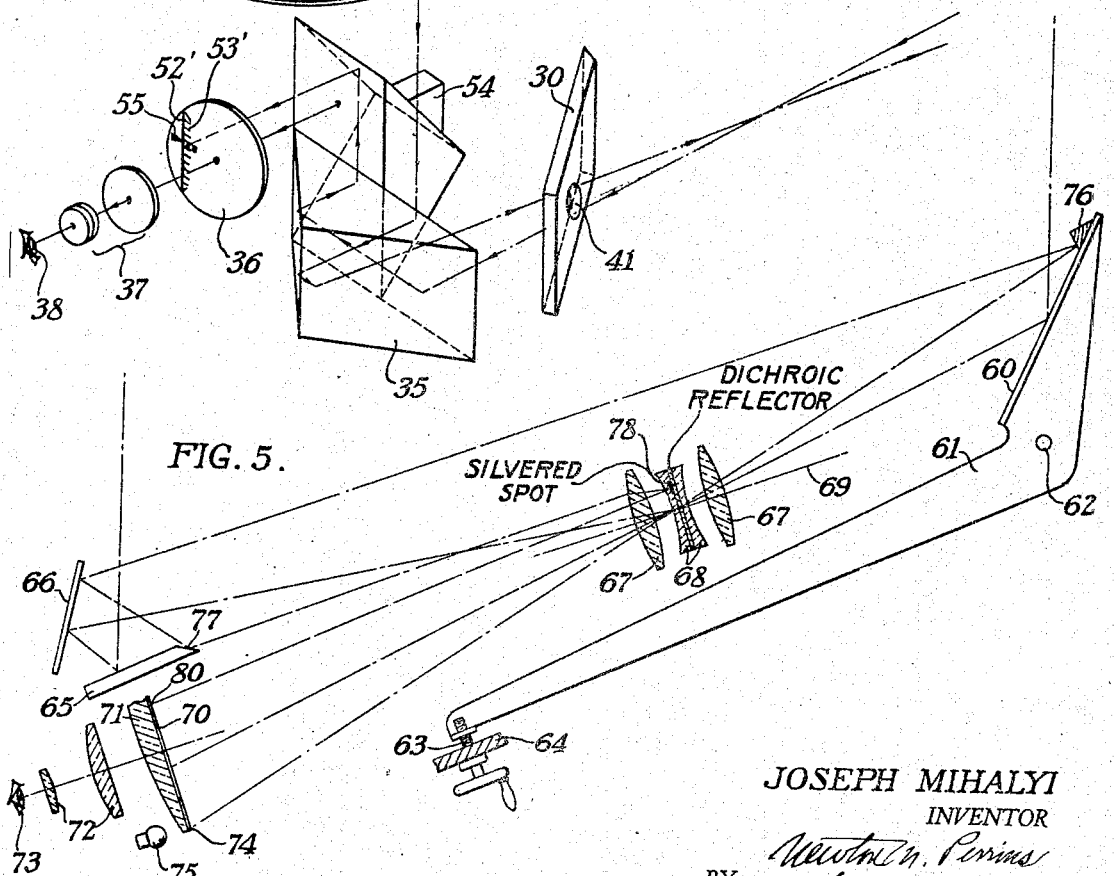

Patented June 4, 1946

2,401,706

UNITED STATES PATENT OFFICE 2,401,706

RANGE FINDER

Joseph Mihalyi, Rochester, N. Y., assignor to Eastman Kodak Company, Rochester, N. Y., a corporation of New Jersey Application March 13, 1943, Serial No. 479,102

17 Claims. (Cl. 88—2.7)

This invention relates to range finders. It is one of a series relating to this same subject, which series includes the following:

| Title | Serial No. | Filed | Inventors |
|---|---|---|---|
| Mount for optical element | 461,584 | Oct. 10, 1942 | Mihalyi. |
| Range finder construction | 461,585 | Oct. 10, 1942 | Do. |
| Range finders—Case A | 472,831 | Jan. 19, 1943 | Do. |
| Range finders—Case B | 472,832 | Jan. 19, 1943 | Do. |
| Range finders—Case C | 472,833 | Jan. 19, 1943 | Do. |
| Range finders—Case D | 472,834 | Jan. 19, 1943 | Mihalyi, MacNeille. |
| Range finders—Case E | 472,835 | Jan. 19, 1943 | Mihalyi, Tuttle. |
| Range finders—Case F | 479,096 | Mar. 13, 1943 | Mihalyi. |
| Range finders—Case G | 479,097 | Mar. 13, 1943 | Do. |
| Range finders—Case H | 479,098 | Mar. 13, 1943 | Holmes, Mihalyi. |
| Range finders—Case I | 479,099 | Mar. 13, 1943 | Mihalyi, MacNeille. |
| Range finders—Case J | 479,100 | Mar. 13, 1943 | MacNeille, Holmes. |
| Range finders—Case K | 479,101 | Mar. 13, 1943 | Mihalyi, MacNeille. |
| Range finders—Case M | 491,954 | June 23, 1943 | MacNeille. |
| Range finders—Case N | 491,955 | June 23, 1943 | MacNeille, Mihalyi. |
| Range finders—Case O | 491,956 | June 23, 1943 | MacNeille. |
| Range finders—Case P | 505,016 | Oct. 5, 1943 | MacNeille, Mihalyi. |
| Range finders—Case T | 508,186 | Oct. 29, 1943 | MacNeille. |

The present invention is fundamentally different from all others of this series, but a preferred embodiment thereof combines it with the auto-collimating features of Cases A to F. The objects of the present invention are simplicity of design, accuracy, ease of use and particularly stability. The latter advantage comes mainly from the use of but a single objective to focus both of the range finder beams.

According to the invention, a range finder is made up with a reflecting-transmitting objective with the same focal power for transmitted and reflected beams, located between the viewing points of the instrument with its optic axis approximately parallel to a line joining the viewing points. A reflecting-transmitting objective is one with a partly transmitting, partly reflecting surface so that light incident on the objective from one side is split into two beams, one being transmitted, the other being reflected and both being focused. A lateral-inverting reflector is positioned at one viewing point to send a light beam to the objective and is preferably in the form of a simple mirror or a single reflecting surface since this is the simplest device which will introduce lateral inversion of an image. A non-lateral-inverting reflector, such as one having two reflecting surfaces to reverse the lateral inversion, is positioned at the other viewing point to reflect the other object light beam to the objective. By the reflection of one beam and the transmission of the other, the objective then forms two object images in a single comparison plane. Of course, two similar images may also be formed on the other side of the objective in a second symmetrically located comparison plane, but in a simple coincidence range finder, I prefer to use only one of the pairs of images. The double plane system is useful, however, in ortho-pseudo stereo range finders, which are discussed in Cases A and K of this series. In any form of the invention some form of eyepiece is provided for viewing the pair of images and light deviating means are provided for deviating one object beam relative to the other for adjusting coincidence of the images.

The preferred form of reflecting-transmitting objective is a symmetrical one having centrally located therein a plano reflecting-transmitting surface. The transmitted beam from either side passes through both halves of the symmetrical objective, whereas the reflected one passes through one-half of the objective twice. Since the objective is symmetrical both beams are focused equally. Furthermore, the objective as a whole can be made quite sturdy and anything which affects the objective as a whole will affect both beams equally. This results in great stability in the range finder.

Preferably, the reflecting-transmitting surface is dichroic to make the images of different colors to aid in distinguishing them. The disadvantages of certain forms of dichroic reflecting-transmitting filters, which have in the past rendered them practically worthless in range finders, are overcome by the use of a reflecting-transmitting surface which consists of optical interference layers which transmit one color and reflect the complementary color. Various forms of optical interfering layers suitable for this purpose are known, such for example as described on page 2, column 1, line 58, to column 2, line 2, of U. S. 2,289,054, Dimmick, wherein the layer is used as a beam splitter. In range finders, according to the present invention the layers are used as a beam combiner and serve to add efficiency to the instrument and distinctiveness to the range finder images. This device is similarly useful in all range finders which employ a beam combiner.

One preferred form of the invention has the lateral-inverting reflector as a simple mirror, the non-lateral-inverting reflector in the form of an optical square such as a penta prism or pair of mirrors and tilts the lateral-inverting mirror to introduce the light deviation required for adjustment of coincidence. By making one of the reflectors semi-transparent or by off-setting the objective slightly so that the object beams pass obliquely therethrough, it is possible to have the comparison plane near one of the viewing points. This requires that the focal length of the objective be slightly less than the distance from that viewing point to the objective.

In a preferred embodiment of the invention, the autocollimating feature of Cases A to F is introduced by locating, at least optically in the comparison plane, a pair of adjustment coincidant elements such as a scale and index, a coincidence line and fiducial mark operating a scale and index or a coincidence line and fiducial mark indicating any maladjustment of the instrument. Light from one of these adjustment coincidant marks is projected through the exact optical equivalent of the range finder system and is brought to focus adjacent to the other element. Of course, it is possible to set up the adjustment coincidant elements in the unused comparison field on the opposite side of the objective, but such an arrangement might allow the introduction of an error, if the objective happened to get out of symmetry. If the element light beam passes through the exact optical equivalent of that traversed by the object beams, the light deviating means operates to adjust both the object images and the element image. When a plano mirror is used as the lateral-inverting reflector, it is preferable to add an auxiliary reflecting surface for reflecting the element beam. Similarly, when the non-lateral-inverting reflector includes two plano mirrors, one of them can reflect both the object beam and the element beam, but the other preferably has an auxiliary reflecting surface for reflecting the element beam. In any autocollimating form of the invention, the element beam must be once transmitted by the reflecting-transmitting surface and once reflected thereby. It is preferable to have a clear area or highly transmitting spot at the point at which the element beam passes through this surface. Similarly, it is preferable to have a highly reflecting spot such as a completely silvered spot at the point at which the element beam is reflected by this surface. One or other of these spots or perhaps both of them is particularly required in the embodiment of the invention wherein the reflecting-transmitting surface is dichroic. Otherwise, one color component of the beam is absorbed (at least reflected) during transmission and the other color component is absorbed (at least transmitted) during reflection, the net result being very low intensity in the element beam. To overcome this, the transmitting spot or the reflecting spot should be neutral and preferably should be highly transmitting or highly reflecting respectively.

In the simplest form of the invention the object beams as reflected from the viewing points to the objective are in substantially exact alignment, i. e. heading straight toward each other and one of the reflectors is semi-transparent and is between the objective and the comparison plane. When this form of the invention is modified to include the auto-collimating feature, the reflector which is semi-transparent preferably has a non-reflecting non-deviating spot for transmitting the element light beam both on the outgoing and return journeys.

The advantages of the invention and certain preferred embodiments thereof will be fully understood from the following description when read in connection with the accompanying drawings, in which:

Fig. 1 is a plan view of a simple form of the invention;

Fig. 2 is a perspective view of a form of the invention including the auto-collimating feature;

Fig. 3 is a plan view of a range finder incorporating the optical system shown in Fig. 2;

Fig. 4 is an enlarged drawing of an alternative mechanism which may be substituted for part of the arrangement shown in Fig. 2;

Fig. 5 illustrates a different embodiment of the invention.

In Fig. 1 a range finder having a housing 10 receives two beams of light from the object being ranged and reflects one of them by a non-lateral-inverting reflector in the form of a penta prism 11 and reflects the other by a semi-transparent mirror 12, both beams being directed in exact alignment toward an objective located between the viewing points of the instrument with its optic axis approximately parallel to the base of the instrument. The objective is symmetrical consisting of two halves 13 and 14 and a semi-transparent mirror 15 cemented between the two halves. Light from the penta prism 11 forms one image in a comparison plane 20 and light from the semi-transparent mirror 12 is reflected by the semi-transparent mirror 15 also into focus in the comparison plane 20. The two object images thus formed are viewed through an eyepiece 21 by the eye 22 of an observer. The mirror 12 may be tilted, i. e. rotated about a pivot 24 by a cam follower 25 engaging a rotatable cam 26. This tilting of the mirror 12 adjusts the coincidence of the two object images. and when they are in exact coincidence the range may be read by a scale 27 rotating with the cam 26, against an index 28.

In Figs. 2 and 3 a similar system is shown in which the object light beams are received respectively by a semi-transparent mirror 30 and a non-lateral-inverting reflector consisting of mirrors 31 and 32. The two beams are directed toward a symmetrical objective made up of two halves 33 with a dichroic filter 34 therebetween. The two object beams as respectively transmitted and reflected pass through an erecting prism 35 and are brought to focus in a reticle plane 36 to form images which may be viewed through an eyepiece 37 by the eye 38 of an observer. To introduce autocollimation, light from a lamp 38 is reflected by a prism 39 passed an index mark 40 located in the comparison plane 36. This element light beam traverses the erecting prism 35 and passes through an aperture 41 in the mirror 30 to be collimated by the objective. Preferably this element light beam is transmitted through a hole 42 in the dichroic filter 34. The collimated element light beam is reflected by the mirror 32 and an auxiliary reflecting surface 43 consisting of a bevel on the mirror 31 passed one side of the objective to strike an auxiliary reflecting surface 44 consisting of a bevel on the mirror 30. The beam reflected from this surface 44 enters the objective, is reflected by the dichroic filter 34 back through the hole 41 and erecting prism 35 to form an image 40' in the comparison plane 36 adjacent to a scale 45 engraved thereon. As shown in Fig. 3 the whole instrument is carried in a housing 46 and the mirror 30 may be rotated about a pivot 48 by a ranging screw 47. This adjustment deviates the object beam reflected by this mirror 30 toward the objective and similarly deviates the element light beam as reflected at the surface 44.

The purpose of the hole 41 is two-fold, mainly to allow the element light beam to traverse the system without any undue absorption and second to prevent any deviation or doubling of the element light beam which might introduce error. The transparent support 42 on the dichroic filter 34 has a similar purpose and in this case is especially necessary since if the element beam as transmitted through the objective were filtered to be one color and then as later reflected to be the complementary color, the amount of light remaining, if any, would be extremely small. The spot at which the element light beam is reflected at the dichroic filter may be silvered so as to be neutral and highly reflecting. The transparent spot 42 is, of course, neutral and highly transmitting.

In Fig. 4, the scale and index shown in Fig. 2 are replaced by a coincidence line and fiducial mark system of the type described in detail in Case F of this series. In Fig. 4 the main differences are that a disk 50, illuminated by a lamp 51 carries a spiral coincidence line 52 and a scale 53. The light from these elements, the line 52 being the adjustment coincidant element in this case, enters the erecting prism 35 through a small prism 54 cemented to one surface thereof. After the element light beam traverses the range finder system it comes to focus forming images 52' and 53' in the image plane 36. As long as the instrument stays in adjustment, the image 52' falls between two fiducial marks 55 and the range may be read by the scale 53' against any suitable index, the fiducial mark 55 serving this purpose as well as any other. Various forms of this feature are described in Case F mentioned above, the present invention not being concerned with the differences therein.

In Fig. 5 one object light beam is received by a simple mirror 60 carried on a support 61 which is rotatable about a pivot 62 by a driving screw 63 mounted in the housing 64 of the instrument, only a section of which is shown. The other object beam is reflected by two mirrors 65 and 66. The two object beams instead of going directly toward one another converge at a slight angle to pass through an objective 67 having a dichroic reflector 68 in the center thereof. As before, the optic axis 69 of the objective 68 is approximately parallel to a line joining the viewing points of the instrument. The beam from the mirror 60 as transmitted by the objective and the beam from the mirror 66 as reflected by the objective are in alignment and form images in a comparison plane 70. Preferably an unsymmetrical field lens 71 is adjacent to this plane to increase the ease of viewing the images through an eyepiece 72 by the eye 73 of an observer. To introduce autocollimation, light from a lamp 75 illuminates an adjustment coincidant element 74 and the element light beam therefrom passes through the objective 67 to strike an auxiliary reflecting surface 76 cemented on the mirror 60, which in turn reflects it to the mirror 66. The element light beam is then reflected by an auxiliary reflecting surface 77 on the mirror 65 toward the objective striking a silvered spot 78 on the dichroic filter 68, whereat it is again reflected and brought to focus forming an image 80 in the comparison plane 70. It will be noted that this embodiment eliminates the need for a semi-transparent viewing point reflector. Of course, the element light beam may strike a transparent spot in the dichroic reflector 68 in which case the silvered spot 78 is not necessary, but still useful. In this particular arrangement, the object image formed by light from the mirror 66 as transmitted by the objective 67 and the object image formed by the mirror 60 as reflected by the objective 67 are not used, but would be useful for any range finder which requires two comparison planes.

Having thus described the preferred embodiments of my invention, I wish to point out that it is not limited to these structures but is of the scope of the appended claims.

What I claim is:

1. A range finder of the type having two spaced viewing points at which light beams are received from an object being ranged and comprising a reflecting-transmitting objective of the same focal power for transmitted and reflected beams, located between the viewing points with its optic axis approximately parallel to a line joining the viewing points, a lateral-inverting reflector at one viewing point for reflecting one object beam to the objective, a non-lateral-inverting reflector at the other viewing point for reflecting the other object beam to the objective whereby, by reflection of one beam and transmission of the other the objective forms two object images in a comparison plane, means for viewing the two images and means for deviating one object beam relative to the other for adjusting the coincidence of the images.

2. A range finder of the type having two spaced viewing points at which light beams are received from an object being ranged and comprising a symmetrical objective between the viewing points with its optic axis approximately parallel to a line joining the viewing points and having a plano reflecting-transmitting surface centrally located in the objective to focus equally reflected and transmitted beams, a lateral-inverting reflector at one viewing point for reflecting one object beam to the objective, a non-lateral-inverting reflector at the other viewing point for reflecting the other object beam to the objective whereby, by reflection of one beam and transmission of the other the objective forms two object images in a comparison plane, means for viewing the two images and means for deviating one object beam relative to the other for adjusting the coincidence of the images.

3. A range finder according to claim 2 in which the reflecting-transmitting surface is dichroic.

4. A range finder according to claim 2 in which the reflecting-transmitting surface consists of optical interference layers which transmit one color and reflect the complementary color.

5. A range finder according to claim 2 in which the lateral-inverting reflector is a single plano mirror, the light deviating means tilts said mirror and the non-lateral-inverting reflector is an optical square.

6. A range finder according to claim 2 in which the distance from one viewing point to the objective is slightly less than the focal length of the objective and the comparison plane is near said viewing point.

7. A range finder according to claim 2 in which a pair of adjustment coincidant elements are located at least optically in the comparison plane and there is included means for projecting through the exact optical equivalent of the object-image forming system, light from one of the elements to form an image adjacent to the other element.

8. A range finder of the type having two spaced viewing points at which light beams are received from an object being ranged and comprising a symmetrical objective between the viewing points with its optic axis approximately parallel to a line joining the viewing points and having a plano reflecting transmitting surface centrally located in the objective to focus equally, reflected and transmitted beams, a lateral-inverting reflector at one viewing point for reflecting one object beam to the objective, a non-lateral-inverting reflector at the other viewing point for reflecting the other object beam to the objective whereby, by reflection of one beam and transmission of the other the objective forms two object images in a comparison plane, a pair of adjustment coindicant elements at least optically in the comparison plane, means including the exact optical equivalent of said objective and said reflectors for receiving an element light beam from one of the elements and for focusing an image of said element adjacent to at least an image of the other element, means for viewing the two object images and means simultaneously for deviating the element beam and one object beam relative to the other for adjusting the coincidence of the images.

9. A range finder according to claim 8 in which the lateral-inverting reflector is a plano mirror with an auxiliary reflecting surface for reflecting the element beams.

10. A range finder according to claim 8 in which the non-lateral-inverting reflector includes two plano mirrors one of which also reflects the element beam and the other of which has an auxiliary reflecting surface for reflecting the element beam.

11. A range finder according to claim 8 in which the reflecting-transmitting surface is dichroic.

12. A range finder according to claim 8 in which the reflecting-transmitting surface includes a spot highly transmitting for transmitting the element beam without appreciable reflection.

13. A range finder according to claim 8 in which the reflecting-transmitting surface is dichroic and includes an approximately neutral highly reflecting spot for reflecting the element beam without appreciable loss of intensity.

14. A range finder according to claim 8 in which the reflecting-transmitting surface is dichroic and includes a neutral transmitting spot for transmitting the element beam without appreciable reflection.

15. A range finder according to claim 8 in which the means for receiving and focusing the element light beam includes the reflecting-transmitting surface with a spot highly transmitting for transmitting the element beam without appreciable reflection, an auxiliary reflecting surface on the lateral-inverting reflector and at least one auxiliary reflecting surface on the non-lateral-inverting reflector also for reflecting the element beam.

16. A range finder according to claim 2 in which the object beams as reflected toward the objective are in substantially exact alignment with each other and with the optic axis of the objective and one of the reflectors is semi-transparent and is between the objective and the comparison plane.

17. A range finder according to claim 8 in which the object beams as reflected toward the objective are in substantially exact alignment with each other and with the optic axis of the objective and one of the reflectors is semi-transparent and is between the objective and the comparison plane, said semi-transparent reflector having a clear substantially non-reflecting non-deviating spot for transmitting the element beam twice, once in each direction.

JOSEPH MIHALYI.